H. GRIMES.
SNOW PLOW.
APPLICATION FILED OCT. 23, 1909.
964,157.
Patented July 12, 1910.
3 SHEETS—SHEET 3.
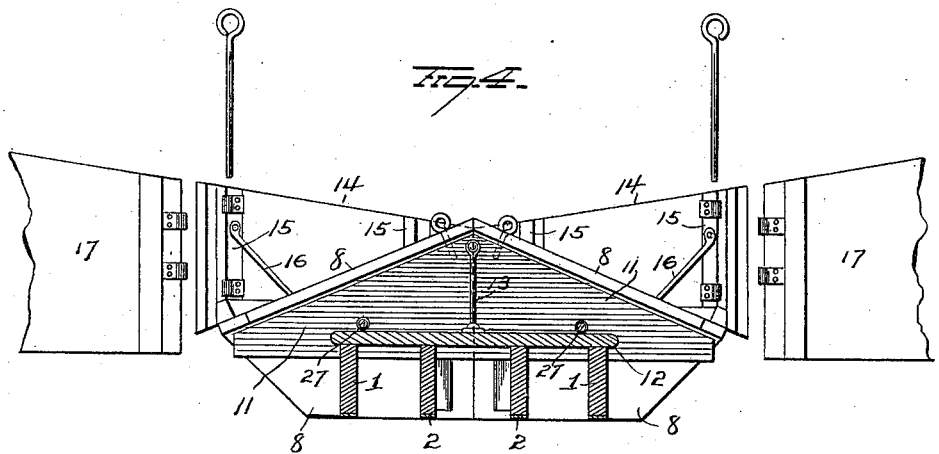
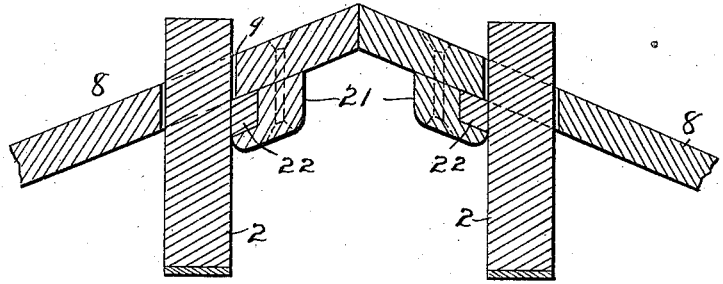
WITNESSES
INVENTOR

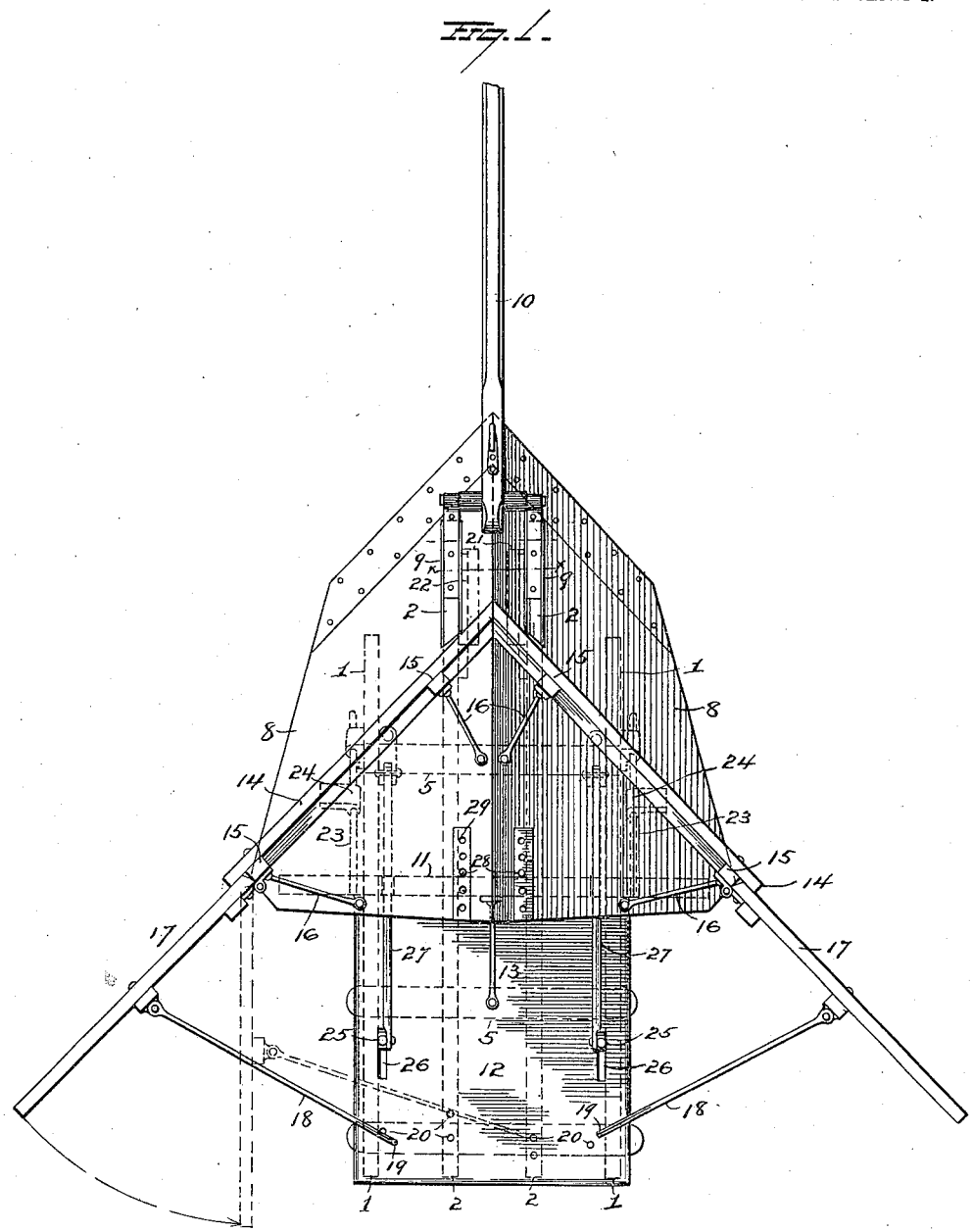

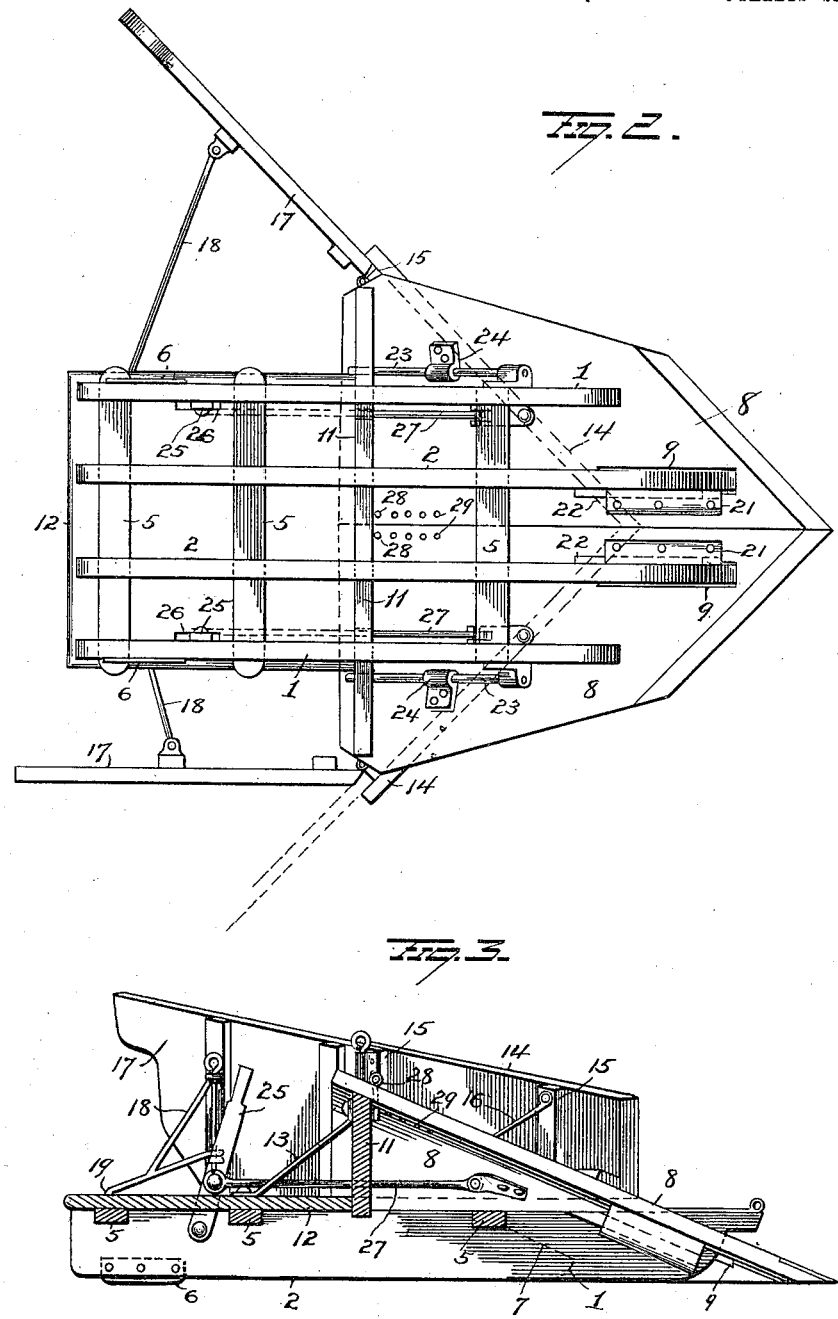

UNITED STATES PATENT OFFICE.

HOWARD GRIMES, OF NEWCOMB, NEW YORK.

SNOW-PLOW.

964,157.  Specification of Letters Patent.  Patented July 12, 1910.

Application filed October 23, 1909.  Serial No. 524,226.

*To all whom it may concern:*

Be it known that I, HOWARD GRIMES, of Newcomb, in the county of Essex and State of New York, have invented certain new and useful Improvements in Snow-Plows; and I do hereby declare the following to be a full, clear, and exact description of the invention, such as will enable others skilled in the art to which it appertains to make and use the same.

This invention relates to improvements in snow plows,—the object of the invention being to so construct a snow plow that it will operate effectually to raise the snow and discharge the same laterally at respective sides of the roadway when the plow is moved along the center of the roadway.

A further object is to provide simple and efficient means for mounting inclined plow boards upon runners and for effecting the adjustment of said plow boards on the runners and relatively to the ground.

With these objects in view the invention consists in certain novel features of construction and combinations of parts as hereinafter set forth and pointed out in the claims.

In the accompanying drawings, Figure 1 is a plan view of a snow plow embodying my improvements. Fig. 2 is a bottom plan view. Fig. 3 is a longitudinal sectional view. Fig. 4 is a transverse sectional view showing the wings 17 detached, and Fig. 5 is a sectional view on the line $x$—$x$ of Fig. 1.

1, 1, and 2, 2, represent a series of four parallel runners suitably spaced apart and braced at intervals by means of a series of cross-bars 5 set in notches in the upper edges of the runners. The two outer runners 1, 1, are provided near their rear ends with shoes or plates 6 which depend slightly below the lower faces of said runners and serve to prevent the machine from undue lateral movement when in use. The forward ends of the outer runners 1, 1, are made with upper beveled faces 7 on which the forward portions of plow boards 8 are mounted. These plow boards incline both rearwardly and laterally and their forward portions near their meeting edges are made with elongated slots 9 through which the forward ends of the intermediate runners 2, 2, freely pass. The forwardly projecting ends of the runners 2, 2, where they are disposed over the plow boards are provided with suitable means for the attachment of a tongue 10,—the latter being provided with attaching means for draft animals. The rear portions of the inclined plow boards are supported upon the beveled upper edges of an upright 11 secured upon the runners and extending transversely across the same and beyond the outer runners 1, 1. This upright is located at the forward end of a platform 12 secured upon the rear portions of the runners 1—2 and is braced centrally by means of a rod 13 secured at one end to said platform and at the other end to the upright in proximity to the apex of the latter.

At points intermediate of their ends, deflector boards 14 are secured upon the plow boards 8,—each deflector board extending from the inner edge of the plow boards to the outer edge of the latter adjacent to the rear end thereof and the forward ends of the two deflector boards are beveled so as to come close together in line with the longitudinal axis of the machine and with the meeting point of the plow boards. These deflector boards may be strengthened by means of battens 15 and braces 16 connecting said battens with the plow boards as clearly shown in Fig. 1. Adjustable wings 17 extend rearwardly from the rear ends of the deflector boards and are hinged to the rear battens 15 on said deflector boards. Each wing 17 has hinged thereto, an arm 18, the free end of which is provided with a depending member or pin 19 which may be inserted in any one of a number of sockets 20 in the platform so that the wings may be disposed at any desired angle with relation to the deflector boards.

From the construction and arrangement of parts above described it will be observed that the forward cutting ends of the plow boards may be disposed approximately in alinement with the lower edges or faces of the runners and in fact by adjusting these plow boards longitudinally, their forward cutting ends may be disposed in a plane somewhat below that of the bottom faces of the runners. The passage of the forward ends of the intermediate runners 2, 2, through the elongated slots in the plow boards may serve to prevent lateral displacement of the latter, but in order to permit the passage of these runners through the slots in the plow boards to be perfectly free, I prefer to provide other means for guiding the plow boards longitudinally. I therefore secure to the under face of each plow board a grooved guide block 21 to receive a guide rib or flange 22 on the adjacent runner 2. For the purpose of retaining the outer portion of the plow boards in proper place and guiding the same, a rod 23 is secured at one end to a suitable bracket on each outer runner 1 and at the other end to the upright 11 and perforated brackets 24 secured to the plow boards move freely on the rods 23.

A lever 25 is pivotally attached at its lower end to each outer runner 1 near the rear end thereof and passes upwardly through the platform, for which purpose the platform is provided with elongated slots 26. The levers 25 are connected with the respective plow boards by means of rods 27. By means of these levers the plow boards can be moved longitudinally so as to change or adjust the relation of their forward cutting ends to the ground and cause them to cut more or less deeply into the snow as occasion may require. Each of the plow boards may be retained in the position to which it may be adjusted by means of a pin 28 passing through any one of a series of holes 29 in said plow boards and engaging the upright 11.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

1. In a snow plow, the combination with a series of runners and a frame thereon, of a plow board slidably mounted in an inclined position on said framework and runners and having its cutting edge in advance of said runners, and means for sliding said plow board forwardly and rearwardly.

2. In a snow plow, the combination with a series of runners and framework thereon, of two plow boards slidably mounted on said framework at an inclination relatively to the runners and relatively to each other, the forward cutting edges of said plow boards projecting beyond the runners, and means for adjusting said plow boards forwardly and rearwardly.

3. In a snow plow, the combination with a series of runners and framework thereon, of a plow board slidably mounted on said framework in an inclined position and having its cutting edge disposed in a plane below that of the top of the runners, and means for moving said plow board forwardly and disposing its cutting edge in a plane below that of the bottom of the runners.

4. In a snow plow, the combination with a series of runners, of inclined plow boards mounted on two of said runners and having slots through which other of said runners pass for the attachment of draft devices, and means connected with the runners and with the plow boards for adjusting the latter with relation to the runners and to the ground.

5. In a snow plow, the combination with two pairs of runners, of plow boards mounted upon one pair of runners, the other pair of runners projecting through said plow boards near the forward ends of the latter, means for supporting the rear portions of said plow boards, one pair of runners and said support being adapted to retain the plow boards inclined with relation to the runners and with relation to each other, means for adjusting the plow boards longitudinally, and means for retaining the plow boards in the positions to which they may be adjusted.

6. In a snow plow, the combination with a series of runners and inclined plow boards mounted thereon, of deflector boards secured upon the plow boards and disposed at an angle to each other.

7. In a snow plow, the combination with a series of runners and inclined plow boards mounted thereon, of deflector boards disposed at an angle to each other and secured upon the upper faces of the plow boards, wings hinged to the rear ends of the deflector boards, and means for adjusting the positions of said wings.

8. In a snow plow, the combination with a series of runners, plow boards supported by the forward portions of the runners and a platform on the rear portions of the runners, of deflector boards disposed at an angle to each other and secured upon the upper faces of the plow boards, wings hinged to the rear ends of the deflector boards, and arms hinged to the wings and adjustably connected to said platform.

9. In a snow plow, the combination with a series of runners, and inclined plow boards supported thereby, of deflector boards disposed at an angle to each other and secured upon the plow boards, and means for moving each plow board and its attached deflector board forwardly and rearwardly.

In testimony whereof, I have signed this specification in the presence of two subscribing witnesses.

HOWARD GRIMES.

Witnesses:
ABEL YANDON,
TANN C. VAPTSAROFF.